United States Patent [19]

Tsuchiya

[11] 4,454,475

[45] Jun. 12, 1984

[54] LIGHT EMISSION DELAY CIRCUIT

[75] Inventor: Ryuichi Tsuchiya, Yokohama, Japan

[73] Assignee: Alps Electric Co., Ltd., Tokyo, Japan

[21] Appl. No.: 431,235

[22] Filed: Sep. 30, 1982

[30] Foreign Application Priority Data

Dec. 25, 1981 [JP] Japan ................................ 56-209098

[51] Int. Cl.[3] ............................................ G01M 15/00

[52] U.S. Cl. .................................. 324/392; 73/119 A

[58] Field of Search ............. 73/119 A; 324/392, 391; 315/78, 79, 80

[56] References Cited

U.S. PATENT DOCUMENTS 4,092,585 5/1978 Bovenlander ........................ 324/392

4,378,695 4/1983 Oshizawa ......................... 73/119 A

FOREIGN PATENT DOCUMENTS 249849 12/1969 U.S.S.R. ........................... 73/119 A

*Primary Examiner*—Ernest F. Karlsen

*Attorney, Agent, or Firm*—Guy W. Shoup; Gerard F. Dunne

[57] ABSTRACT

A light emission delay circuit adjusts a light emission time of a timing light into conformity with a time when a piston in an engine cylinder reaches a top dead center in detecting an ignition time for the engine cylinder. The light emission delay circuit comprises first means responsive to a first signal indicative of the ignition timing for the engine cylinder and a second signal having a leading edge substantially agreeing with the ignition time of the engine cylinder for producing a third signal having a leading edge with a leading edge of the second signal. The third signal is produced substantially two periods beyond the ignition time of the first signal, and also has a width of time equal to the period of the second signal. Second means for delaying the leading edge of the third signal, third means for generating a fourth signal having a leading edge aligned with the leading edge of the third signal as delayed by the second means and a trailing edge aligned with a trailing edge of the third signal as supplied from the first means, and fourth means for counting a clock signal upwardly during the interval of the fourth signal and then counting the clock signal downwardly during an interval equal to the interval of the fourth signal to produce an output signal for enabling the timing light to emit light are also provided.

5 Claims, 7 Drawing Figures

PRIOR ART
Fig.1
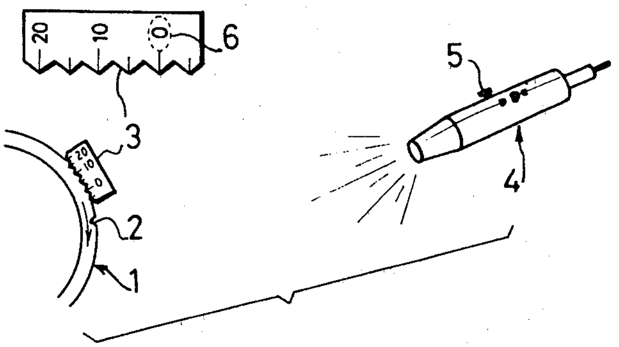
Fig.2(A)
Fig.2(B)
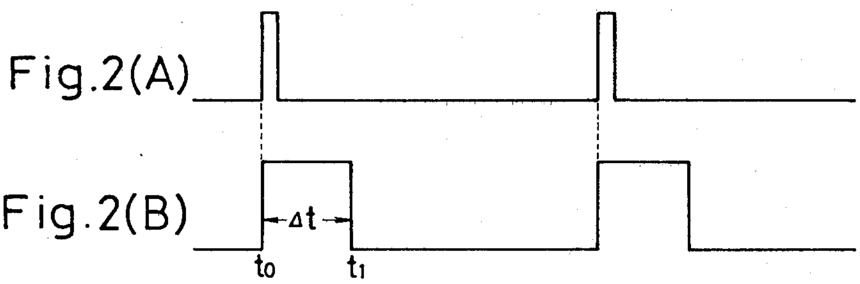
Fig.3(A)
Fig.3(B)
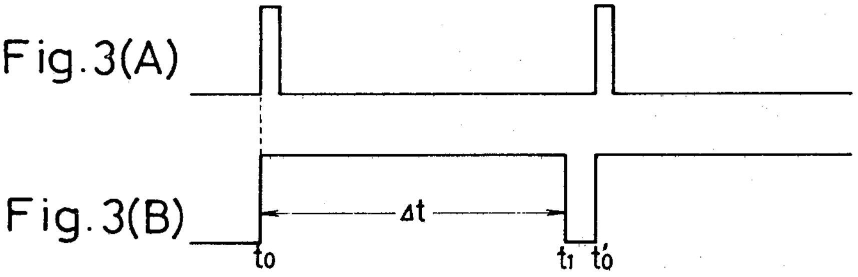

LIGHT EMISSION DELAY CIRCUIT

BACKGROUND OF THE INVENTION

The present invention relates to a light emission delay circuit for adjusting the timing of a timing light for detecting ignition timing for an automobile engine.

Efficient operation of automobile engines requires that an air-fuel mixture be ignited in a combustion chamber when the piston is closest in its compression stroke to the ignition plug, that is, when the piston reaches the top dead center (hereinafter referred to as "TDC"). In reality, however, some automobile engines ignite the air-fuel mixture just before the piston arrives at the TDC as a certain interval of time elapses before the mixture is combusted after the ignition plug has produced a spark. This type of automobile is known as an "BTDC" automobile. Other automobile engines effect ignition of an air-fuel mixture after the piston has moved past the TDC for the purpose of emission control. An automobile equipped with such engines is referred to as a "ATDC" automobile.

Ignition timing with respect to the timing with which the piston reaches the TDC is an important factor for determining the performance of an engine. Therefore, the adjustment of ignition timing is one of vital tasks in servicing automobile engines. One known ignition timing detector necessary for ignition timing adjustment is a timing light.

Known ignition timing detectors however typically have a poor resolution and a reduced degree of accuracy due to an increased delay time required for light emission by the timing light. Furthermore, a light emission delay circuit for the ignition timing detector is relatively unstable in operation and less immune to external noise.

SUMMARY OF THE INVENTION

It is an object of the present invention to provide a light emission delay circuit which will eliminate the difficulties of the prior art by providing a shortened delay time capable of adjusting light emission timing of a timing light for the detection of ignition timing of ATDC automobiles.

The above object can be achieved by delaying light emission timing of a timing light with a means capable of adjusting delay times and an up-down counter, utilizing as a reference a particular leading edge of an ignition coil signal which is advanced in time with respect to a leading edge of a first cylinder reference signal.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic diagram of a conventional ignition timing detector;

FIG. 2 is a diagram illustrative of an example of light emission timing of the ignition timing detector shown in FIG. 1;

FIG. 3 is a diagram showing another example of light emission timing of the ignition timing detector of FIG. 1;

DETAILED DESCRIPTION

Figure 4:
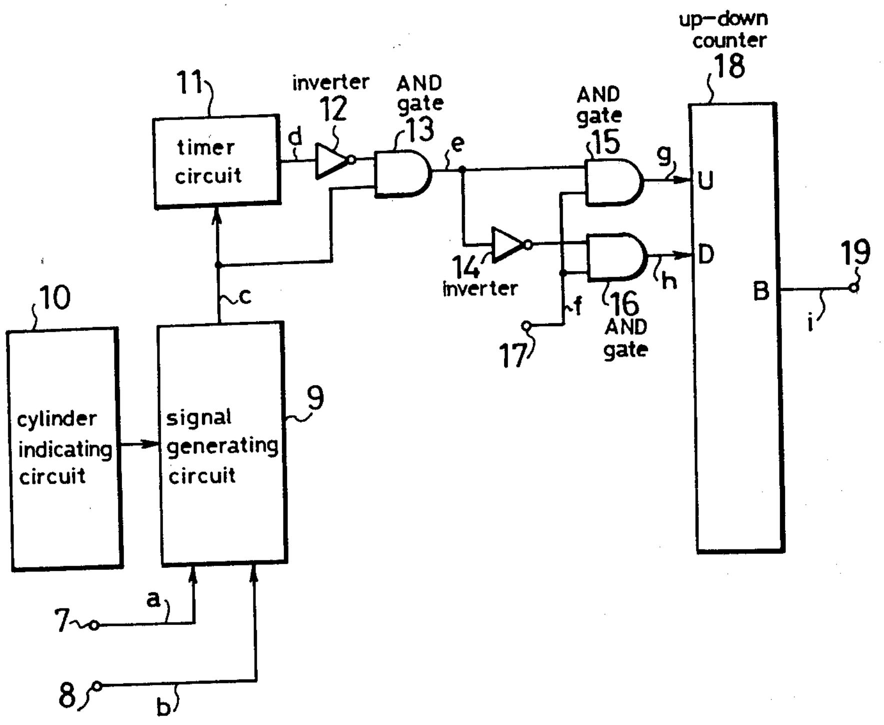
FIG. 4 is a block diagram of a light emission delay circuit according to the present invention.

FIG. 1 shows a conventional ignition timing detector using a timing light. The ignition timing detector includes a crank pulley 1, a timing mark 2 on the crank pulley 1, a timing indicator 3 placed adjacent to the crank pulley 1, a timing light 4, and a delay angle adjustment knob 5, the arrangement being that while the crank pulley 1 is rotating, the time when the piston in a first engine cylinder reaches the TDC is known from alignment of the timing mark 2 with a zero point 6 on the timing indicator 3.

By adjusting the delay angle adjustment knob 5, the light emission timing of the timing light 4 can be delayed as desired. The adjustment of the delay angle adjustment knob 5 causes a pulse generator (not shown) to be adjusted for producing a pulse signal having a pulse width extending from the time when the spark is generated in the first cylinder to the time when the light is emitted by the timing light 4. For the detection of ignition timing, the delay angle adjustment knob 5 is operated to enable the timing light 4 to emit light when the timing mark 2 is aligned with the zero point 6 on the timing indicator 3. When the timing light 4 thus gives off light upon alignment of the timing mark 2 with the zero point 6 on the timing indicator 3, the pulse width of a pulse signal generated by the pulse generator is equal to the difference in time between the ignition of the first cylinder and the arrival of the piston therein at the TDC. Thus, the ignition timing can be detected using such a pulse signal.

The timing of light emission from the timing light 4 is delayed with respect to the ignition timing of the first cylinder. The timing light 4 is therefore energized by a signal which is obtained by delaying a first cylinder reference signal indicative of the ignition timing of the first cylinder.

More specifically, with BTDC automobiles, the spark is timed to occur just before the piston reaches the TDC, and for this purpose, a light emission time $t_1$ of the timing light 4 is delayed by a slight time interval $\Delta t$ prior to arrival at the TDC as shown in FIG. 2(B) with respect to a time $t_0$ when a leading edge occurs of a first cylinder reference signal indicative of the ignition timing of the first cylinder as shown in FIG. 2(A).

With ATDC automobile, however, the spark is timed to be generated immediately after the piston has moved past the TDC. Therefore, as shown in FIG. 3(B), a light emission time $t_1$ of the timing light 4 needs to be delayed with respect to a time $t_0$ when a first cylinder reference signal has its leading edge as illustrated in FIG. 3(A), by a sufficiently large time interval $\Delta t$ extending to a point just before a time $t_0'$ when the leading edge of a next first cylinder reference signal occurs.

When the time interval $\Delta t$ by which the light emission time is delayed is increased with respect to a range in which the delay angle adjustment knob 5 is movable, the timing light 4 suffers from a poor resolution and a reduced accuracy. The signal delay circuit for the timing light should be capable of producing increased time delays, an arrangement which is unstable in operation and less immune to external noise.

FIG. 4 shows in block form a light emission delay circuit according to the present invention. The light emission delay circuit comprises input terminals 7, 8, a circuit 9 for generating signals respectively for engine cylinders, a circuit 10 for indicating the engine cylinders, a timer circuit 11, an inverter 12, an AND gate 13, an inverter 14, AND gates 15, 16, an input terminal 17, an up-down counter 18, and an output terminal 19.

Figure 5:
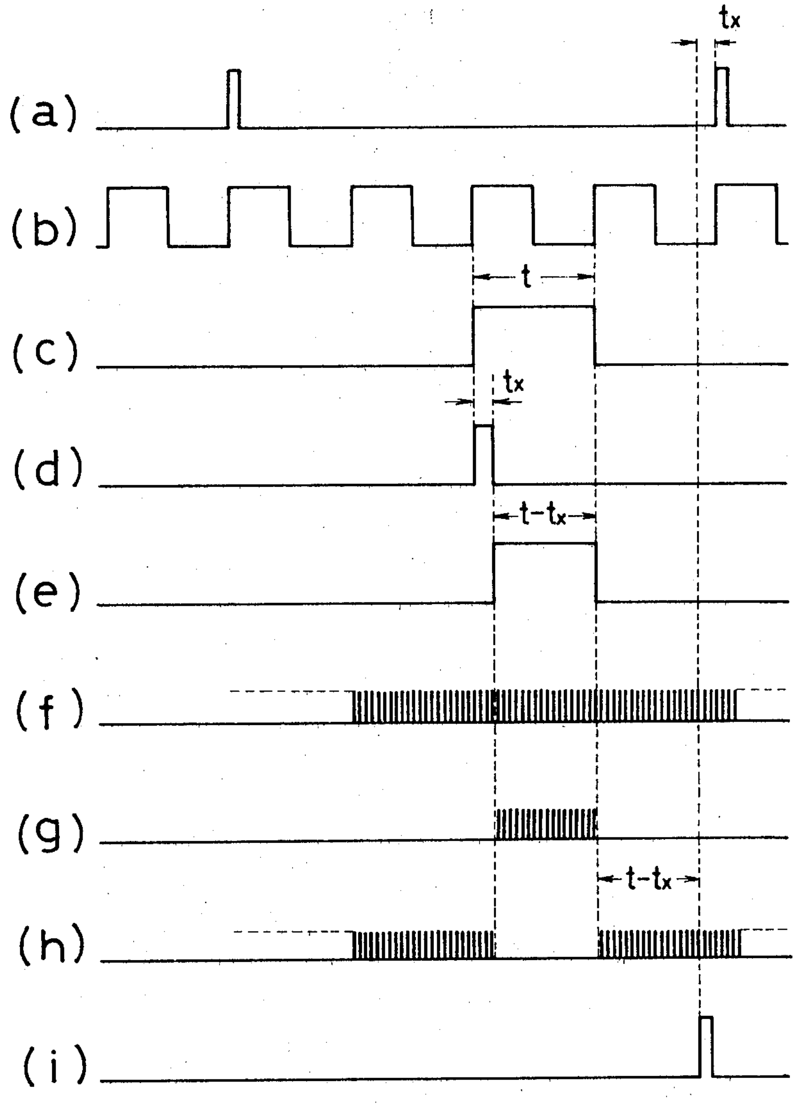
FIG. 5 is a timing chart showing the timing of the various signals-a-i generated in the light emission delay circuit of FIG. 4 at the respective points a-i illustrated in the circuit of FIG. 4.

FIG. 5 is a timing chart showing the timing for signals generated in the circuit of FIG. 4, the signals being denoted by reference characters corresponding to those shown in FIG. 4.

Operation of the light emission delay circuit will now be described, the light emission delay circuit being incorporated in a four-cylinder engine in the illustrated embodiment.

As shown in FIGS. 4 and 5, the signal generating circuit 9 is supplied with a first cylinder reference signal a from the input terminal 7 and an ignition coil signal b from the input terminal 8. The ignition coil signal b has a waveform shaped such that its leading edges agree with the times when the cylinders are ignited. Therefore, the leading edges of the first cylinder reference signal a indicating ignition of the reference cylinder are aligned with leading edges of the ignition coil signal b.

The signal generating circuit 9 is responsive to a signal from the cylinder indicating circuit 10 for generating a pulse signal c for a particular engine cylinder. The pulse signal c has a leading edge two periods of the ignition coil signal b from a leading edge of the first cylinder reference signal a, and a pulse width equal to a period t of the ignition coil signal b. Since it is impossible to detect a time earlier than a leading edge of the first cylinder reference signal based on such a leading edge, the pulse signal c is actually produced which has a leading edge delayed by $4-2=2$ periods with respect to a leading edge of the first cylinder reference signal a.

The signal c is supplied from the signal generating circuit 9 to the timer circuit 11 and the AND gate 13. The timer circuit 11 is responsive to the signal c for generating a pulse signal d having a leading edge aligned with the leading edge of the singal c. The timer circuit 11 is adjustable by a delay angle adjustment knob such as shown at 5 in FIG. 1 for varying a pulse width $t_x$ ($t_x<t$) of the pulse signal d. The pulse signal d supplied from the timer circuit 11 is inverted by the inverter 12 and then is delivered to the AND gate 13. The AND gate 13 is responsive to the signal c and the inverted pulse signal d to produced a gate pulse signal e having a leading edge aligned with a trailing edge of the pulse signal d and a trailing edge aligned with a trailing edge of the signal c, the gate pulse singal e having a pulse width $t-t_x$. The gate pulse signal e is supplied to the AND gate 15 and at the same time is inverted by the inverter 14 from which the inverted signal is supplied to the AND gate 16.

The AND gates 15, 16 are supplied with a clock signal f from the input terminal 17. The AND gate 15 allows the clock signal f to pass therethrough during the time interval $t-t_x$ of the gate pulse signal e, and the AND gate 16 prevents the clock signal f from passing therethrough during the time interval $t-t_x$ of the gate pulse signal e.

The up-down counter 18 has an up-count terminal U supplied with a clock signal g from the AND gate 15, and a down-count terminal D supplied with a clock signal h from the AND gate 16. The up-down counter 18 counts upwardly from the clock signal g and then counts downwardly from the clock signal h, and produces a borrow singal i at a borrow terminal B when the count falls to zero. The borrow signal i is supplied to a timing light such as shown at 4 in FIG. 1 to enable the same to emit light.

The borrow signal i is produced by the up-down counter 18 when the latter counts down the same number of the clock pulses h as that of the clock pulses g supplied to the up-count terminal U. Thus, the interval of time in which the up-down counter 18 counts down the pulses is equal to the pulse interval $t-t_x$ of the gate pulse signal e. The difference in time between the borrow signal i and the first cylinder reference signal a is expressed by:

$$2t-\{t_x+2(t-t_x)\}=t_x$$

which is equal to the pulse width of the pulse signal d supplied from the timer circuit 11.

The timer circuit 11 is adjustable to bring the time when the timing light emits light in response to the borrow singal i into agreement with the time when the timing mark 2 is aligned with the zero point 6 on the timing indicator 3 as shown in FIG. 1. Accordingly, the ignition timing can be detected from the amount of adjustment made in the timer circuit 11.

The light emission timing of the timing light can thus be ajusted by adjusting the delay interval $t_x$ by which the leading edge of the signal c is delayed by the timer circuit 11. The amount of delay produced by the timer circuit 11 is quite small extending from the time when the piston arrives at the TDC to a next ignition time. The range in which the delay angle adjustment knob is movable can be rendered larger as compared with the delay interval, with the results that the ignition timing detector has an improved resolution and accuracy and will operate stably.

While in the illustrated embodiment the light emission delay circuit has been shown and described as being incorporated in a four-cylinder engine, the present invention is not limited to such an engine but applicable to n-cylinder engines (n is an integer equal to or greater than 2). With the n-cylinder engines, the signal produced from the signal generating circuit 9 should have a pulse width having a leading edge delayed by $(n-2)$ periods of the ignition signal with respect to a leading edge of the first cylinder reference signal and also a period equal to that of the ignition coil signal.

With the arrangement of the present invention, a light emission time of the timing light is delayed from a leading edge, two periods ahead, of the ignition coil signal with respect to the first cylinder reference signal, the time being delayed partly by an up-down counter. Since the adjustable amount of delay is in a sufficiently small range, the time interval in which the timing light emits light can be selected to be sufficiently small. The ignition timing detector will therefore operate stably and detect ignition timing at a higher resolution and accuracy. The light emission delay circuit of the present invention is thus free from the prior art difficulties.

Although a certain preferred embodiment has been shown and described, it should be understood that many changes and modifications may be made therein without departing from the scope of the appended claims.

What is claimed is:

1. A light emission delay circuit for a timing light for adjusting the emission of light resulting from an ignition signal to a time when a piston in an engine cylinder reaches a top dead center position, comprising:

(a) first means responsive to a first signal indicative of the time for the ignition of a particular engine cylinder and a second signal having a leading edge substantially indicating the ignition time of each engine cylinder for producing a third signal having a leading edge aligned with a leading edge of said second signal, said third signal being substantially two periods of said second signal beyond said first signal and having a pulse width equal to the period of said second signal;

(b) second means for delaying said leading edge of said third signal;

(c) third means for generating a fourth signal having a leading edge aligned with the leading edge of said third signal as delayed by said second means and a trailing edge aligned with a trailing edge of said third signal as supplied from said first means; and (d) fourth means for counting a clock signal upwardly during the interval of said forth signal and then counting said clock signal downwardly during an interval equal to said interval of said fourth signal to produce an output signal for enabling the timing light to emit light.

2. A light emission delay circuit according to claim 1, including means for producing a signal indicative of one out of a plurality of engine cylinders, said first means being responsive to said last-mentioned signal for generating said third signal for said one of the engine cylinders.

3. A light emission delay circuit according to claim 1, wherein said second means comprises a timer circuit connected to an output terminal of said first means and having an output terminal, an inverter having an input terminal connected to said output terminal of said timer circuit and an output, and an AND gate having a first input terminal connected to said first means, a second input terminal connected to said output terminal of said inverter, and an output for delivering said third signal as delayed.

4. A light emission delay circuit according to claim 1, wherein said third means comprises a clock input terminal for supplying said clock signal, an inverter having an input terminal connected to an output terminal of said second means, a first AND gate having a first input terminal connected to said output terminal of said second means, a second input terminal connected to said clock input terminal, and a first output connected to said fourth means, and a second AND gate having a first input terminal connected to said output terminal of said inverter, a second input terminal connected to said clock input terminal, and a second output terminal connected to said fourth means.

5. A light emission delay circuit according to claim 4, wherein said fourth means comprises an up-down counter having an up-count input terminal connected to said first output terminal of said first AND gate, a down-count input terminal connected to said second output terminal of said second AND gate, and an output for producing said output signal of said fourth means.

* * * * *